DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 9, 1970

875 O.G. 342

T875,010

COPOLYESTER MOLDING COMPOSITION

Harry W. Coover, Jr., Newton H. Shearer, Jr., and Thomas H. Wicker, Jr., all of P.O. Box 511, Kingsport, Tenn. 37662

Continuation of application Ser. No. 533,873, Mar. 14, 1966. This application Nov. 20, 1969, Ser. No. 872,444

Int. Cl. C08q *17/08*

U.S. Cl. 260—75

No Drawing. 18 Pages Specification

Improved copolyester molding compositions are provided consisting essentially of substantially equimolar amounts of the polymeric residues of (A) one or more dicarboxylic acids or their acid functioning derivatives and (B) a mixture of 20–45 mol percent of 2,2,4,4-tetramethyl-1,3-cyclobutanediol and 80–55 mol percent of 1,4-cyclohexanedimethanol. These compositions have the combination of a heat-distortion temperature, measured at 264 p.s.i. of stress of at least 95° C. and a 23° notched Izod impact strength of at least 13.0 ft. lb. per inch of notch. In a preferred embodiment of this invention, the copolyester molding composition contains equimolar amounts of the polymeric residues of a terephthalate ester and a mixture of 20–35 mol percent of 2,2,4,4-tetramethyl-1,3-cyclobutanediol with the remainder being 1,4-cyclohexanedimethanol.